United States Patent
Takada et al.

(10) Patent No.: US 6,929,362 B2
(45) Date of Patent: Aug. 16, 2005

(54) INK SET AND IMAGE FORMING PROCESS, AND WATER-BASED INK USED THEREIN

(75) Inventors: Yoichi Takada, Kanagawa (JP); Shinya Mishina, Kanagawa (JP); Shinichi Hakamada, Kanagawa (JP); Yasuhiro Nito, Kanagawa (JP); Masashi Tsujimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/735,902

(22) Filed: Dec. 16, 2003

(65) Prior Publication Data

US 2004/0125185 A1 Jul. 1, 2004

Related U.S. Application Data

(63) Continuation of application No. PCT/JP03/11831, filed on Sep. 17, 2003.

(30) Foreign Application Priority Data

Sep. 17, 2002 (JP) ........................................ 2002-270719

(51) Int. Cl.⁷ ................................................. B41J 2/01
(52) U.S. Cl. ........................................ 347/100; 347/96
(58) Field of Search ................................. 347/101, 100, 347/96, 95; 106/31.6, 31.13, 31.27; 523/160; 428/195, 32.1

(56) References Cited

U.S. PATENT DOCUMENTS

| | | | |
|---|---|---|---|
| 4,313,124 A | 1/1982 | Hara ....................... 346/140 R |
| 4,345,262 A | 8/1982 | Shirato et al. .......... 346/140 R |
| 4,459,600 A | 7/1984 | Sato et al. .............. 346/140 R |
| 4,463,359 A | 7/1984 | Ayata et al. ................. 346/1.1 |
| 4,558,333 A | 12/1985 | Sugitani et al. ......... 346/140 R |
| 4,608,577 A | 8/1986 | Hori ........................ 346/140 R |
| 4,723,129 A | 2/1988 | Endo et al. .................. 346/1.1 |
| 4,740,796 A | 4/1988 | Endo et al. .................. 346/1.1 |
| 5,531,818 A | * 7/1996 | Lin et al. ..................... 347/100 |
| 5,695,820 A | * 12/1997 | Davis et al. .................... 347/96 |
| 5,734,403 A | 3/1998 | Suga et al. .................. 347/101 |
| 5,792,249 A | * 8/1998 | Shirota et al. ............... 347/100 |
| 5,993,524 A | * 11/1999 | Nagai et al. .............. 106/31.27 |
| 6,020,398 A | 2/2000 | Erdtmann et al. .......... 523/160 |
| 6,027,210 A | 2/2000 | Kurabayashi et al. ....... 347/100 |
| 6,084,619 A | 7/2000 | Takemoto et al. ............ 347/96 |
| 6,238,045 B1 | 5/2001 | Ono et al. ..................... 347/96 |
| 6,286,953 B1 | 9/2001 | Takemoto et al. .......... 347/100 |
| 6,341,854 B1 | * 1/2002 | Takemoto .................... 347/96 |
| 6,435,658 B1 | 8/2002 | Kato et al. ..................... 347/43 |
| 6,506,239 B1 | 1/2003 | Osumi et al. ............ 106/31.27 |
| 6,538,047 B1 | * 3/2003 | Miyabayashi ................ 347/96 |
| 6,540,329 B1 | 4/2003 | Kaneko et al. ................ 347/43 |
| 6,582,070 B2 | 6/2003 | Takada et al. .............. 347/100 |
| 2002/0093557 A1 | 7/2002 | Takuhara et al. ........... 347/100 |
| 2003/0064206 A1 | * 4/2003 | Koyano et al. ............. 428/195 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |

(Continued)

*Primary Examiner*—Manish Shah
(74) *Attorney, Agent, or Firm*—Fitzpatrick, Cella, Harper & Scinto

(57) ABSTRACT

An ink set including a water-based ink containing a coloring material in a state dissolved or dispersed in an aqueous medium and a water-based reactive liquid containing a first component for insolubilizing or aggregating the coloring material in the ink by mixing with the water-based ink. The water-based reactive liquid contains a water-soluble high-molecular compound in a state dissolved therein. The water-based ink contains a second component, which is not insolubilized by the first component and the coloring material, in a state dissolved therein. The water-soluble high-molecular compound is not insolubilized by the first component and the coloring material but insolubilized by the second component.

16 Claims, 4 Drawing Sheets

⊖ COLORING MATERIAL
△ SECOND COMPONENT
⊕ FIRST COMPONENT
∽ WATER-SOLUBLE HIGH-MOLECULAR COMPOUND

FOREIGN PATENT DOCUMENTS

| | | | |
|---|---|---|---|
| JP | 60-71260 | 4/1985 | |
| JP | 2783647 | 1/1992 | |
| JP | 6-106735 | 4/1994 | |
| JP | 6-86142 B2 | 10/1994 | |
| JP | 07034008 A * | 2/1995 | ............ C09D/5/00 |
| JP | 9-207424 | 8/1997 | |
| JP | 11-78211 A | 3/1999 | |
| JP | 2000-1641 | 1/2000 | |
| JP | 2000-37942 | 2/2000 | |
| JP | 2000-94825 | 4/2000 | |
| JP | 2000136336 A * | 5/2000 | ........... C09D/11/00 |
| JP | 2000-281947 | 10/2000 | |
| JP | 2002-52804 | 2/2002 | |
| JP | 2002-211106 | 7/2002 | |
| JP | 2002-332437 | 11/2002 | |

* cited by examiner

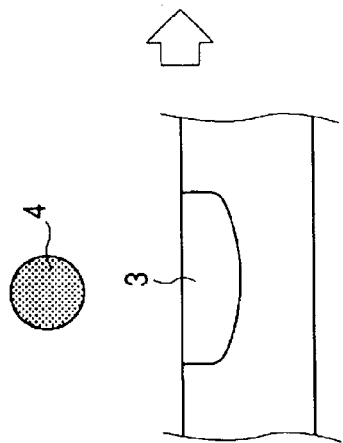
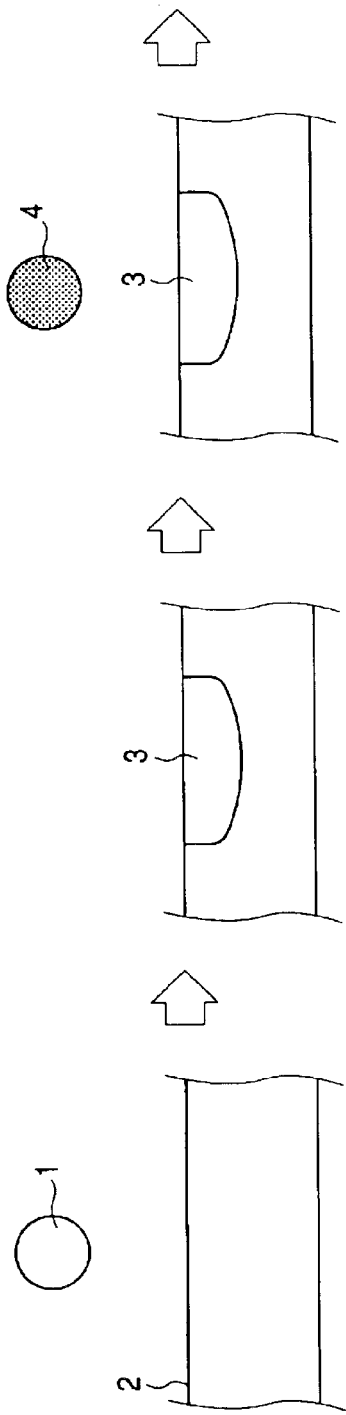
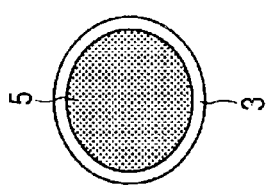
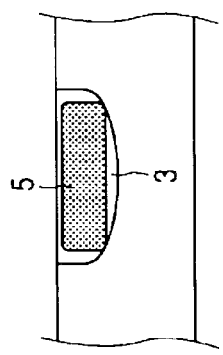
FIG. 1A  FIG. 1B  FIG. 1C
FIG. 1D
FIG. 1E
(PLAN VIEW FROM ABOVE OF FIG. 1D)

⊙ COLORING MATERIAL
△ SECOND COMPONENT
⊕ FIRST COMPONENT
∼ WATER-SOLUBLE HIGH-MOLECULAR COMPOUND

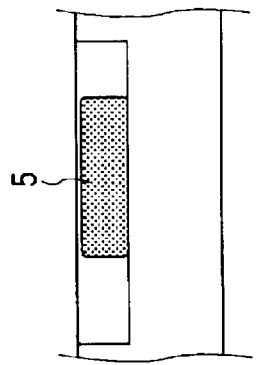
FIG. 3A
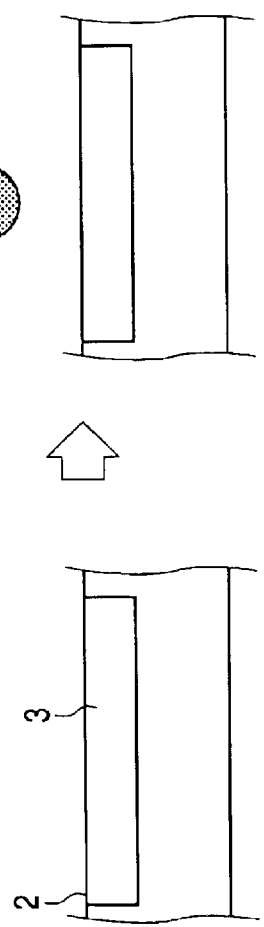
FIG. 3B
FIG. 3C
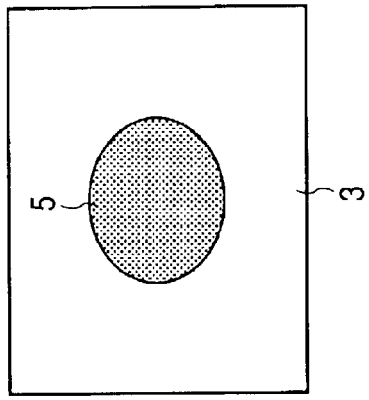
FIG. 3D
(PLAN VIEW FROM ABOVE OF FIG. 3C)

INK SET AND IMAGE FORMING PROCESS, AND WATER-BASED INK USED THEREIN

This application is a continuation of International Application No. PCT/JP03/11831, filed Sep. 17, 2003, which claims the benefit of Japanese Patent Application No. 2002-270719, filed Sep. 17, 2002.

BACKGROUND OF THE INVENTION

1. Field of the Invention

The present invention relates to an ink set comprising in combination an ink and a reactive liquid containing a component reacting with a component contained in the ink and an image forming process, which are suitable for use in ink-jet printers, and a water-based ink used therein, and particularly to an ink set and an image forming process, which are useful for plain paper, and a water-based ink used therein.

2. Related Background Art

Ink-jet recording is a printing method wherein minute droplets of an ink are ejected to apply them to a recording medium such as paper, thereby conducting printing, and wherein high-resolution and high-quality images can be printed at high speed by an inexpensive apparatus and has been commonly used as a way of simply forming high-quality color images in recent years. There is, however, a demand for formation of higher-quality color images. On the other hand, various proposals have heretofore been made as to devices for forming higher-quality color images. For example, it has been proposed to use a black ink having characteristics of thickening or aggregating by an action with a salt and a color ink containing the salt in combination, thereby providing high-quality color images high in image density and free from occurrence of bleeding (color mixing between different colors) (see Japanese Patent Application Laid-Open No. H6-106735). In other words, according to this method, two inks different in properties from each other, i.e., the color ink containing the salt, that is the second liquid, and the black ink that is the first liquid, are used to form a print, whereby components in these two liquids are caused to react to form aggregates of coloring materials, thereby permitting formation of good-quality images. More specifically, a salt of a polyvalent metal ion is used as the salt.

Various proposals have also been made on formation of high-quality color images by using two liquids different in properties from each other, i.e., a set composed of a combination of a liquid composition containing no coloring material and an ink (see Japanese Patent Application Laid-Open Nos. H9-207424 and 2000-37942). As the liquid composition used in combination with the ink, for example, proposals have been made on liquid compositions containing a polyvalent metal salt having excellent reactivity to an anionic coloring material to easily form an aggregate of the coloring material and additionally a nonionic resin (see Japanese Patent Publication No. H6-86142 and Japanese Patent Application Laid-Open No. 2000-94825).

The present inventors have carried out a further extensive investigation as to the ink sets containing the polyvalent metal salt among these proposals. As a result, it has been confirmed that printing is conducted by such a printing method as disclosed in Japanese Patent Application Laid-Open No. H6-106735, whereby high-quality color images high in image density and free from occurrence of bleeding can be provided.

On the other hand, it has also been known to add a substance for increasing binding property between an aggregate of a coloring material and the surface of paper or between such aggregates, i.e., a substance having binding ability to an ink to improve the rub-off resistance of the resulting image (see Japanese Patent Publication No. H6-86142 and Japanese Patent Application Laid-Open No. 2000-94825). There have further been known a technique that a reactive liquid containing a cationic resin is applied to a recording medium to aggregate a component in an ink (Japanese Patent Application Laid-Open No. 2000-281947), a technique that a component for further hardening a resin in an ink-receiving layer that is dried and solidified is contained in an ink (Japanese Patent Application Laid-Open No. 2000-1641), and a technique that a substance for thickening a high-molecular compound in an ink is applied to a recording medium (Japanese Patent Application Laid-Open No. HI 1-78211), and the like.

SUMMARY OF THE INVENTION

However, the combinations of the reactive liquid and the ink composition described in these prior art documents involve a new problem because of their relatively high reactivity in actual image formation though the documents describe an idea effected in theory. More specifically, a reaction forming the aggregate of the coloring material is almost completed at a point of time (immediately or at most in about several hundreds of milliseconds) when the liquid composition has come into contact with the ink because the reactivity of the polyvalent metal ion is high, so that a color material component reacted with the liquid composition may have remained on the recording medium in some cases. The image in such a state may be rubbed off when a printed portion is rubbed. Such a phenomenon has the possibility of forming an image that is soiled upon, in particular, double-side printing.

It is therefore an object of the present invention to provide an ink set and an image forming process, by which an image can be formed where substantially even rub-off resistance is realized on a recording medium, no image soiling is caused even upon double-side printing, and a high-quality image having improved clarity at a contour portion of the image and free from occurrence of bleeding can be provided, and an ink used therein.

The present inventors have found in the course of an investigation to solve the above-described problems involved in the prior art that when in a combination of the ink and reactive liquid having the above-described respective features, a substance (second component) reacting with a water-soluble high-molecular compound in the reactive liquid to destabilize it is contained in the ink, adhesion between an aggregate of the coloring material and the surface of a recording medium, adhesion between aggregates of the coloring material, and rub-off resistance of a printed area after printing are easily improved on the recording medium without complicating the apparatus used. The present invention has been led to completion on the basis of this finding.

According to the present invention, there is thus provided an ink set comprising a water-based ink containing a coloring material in a state dissolved or dispersed in an aqueous medium and a water-based reactive liquid containing a first component for insolubilizing or aggregating the coloring material in the ink by mixing with the water-based ink, wherein the water-based reactive liquid contains a water-soluble high-molecular compound in a state dissolved therein, the water-based ink contains a second component, which is not insolubilized by the first component and coloring material, in a state dissolved therein, and the water-soluble high-molecular compound is not insolubilized by the first component and coloring material but insolubilized by the second component.

According to the ink set, a high-quality image having improved clarity at a contour portion of the image and free from occurrence of bleeding can be provided.

According to the present invention, there is also provided an image forming process comprising the steps of (i) applying the water-based ink making up the above-described ink set to a recording medium by an ink-jet recording method; and (ii) applying the water-based reactive liquid making up the ink set to the recording medium, wherein the step (ii) is conducted prior to the step (i) in such a manner that the water-based ink comes into contact with the water-based reactive liquid on the recording medium.

The image formed by this process is such that the coloring material is surely retained in the recording medium in such a manner that image loss does not occur, and a contour portion of the image is clear.

According to the present invention, there is further provided a water-based ink suitable for use in conducting ink-jet recording on a recording medium, to which a water-based reactive liquid containing a water-soluble high-molecular compound and a first component for insolubilizing or aggregating a coloring material has been applied, wherein the ink contains the coloring material in a state dissolved or dispersed in an aqueous medium and has a second component for insolubilizing the water-soluble high-molecular compound.

The ink according to the present invention also achieves the above-described image formation and permits forming an image that has heretofore been unable to be provided.

As preferred modes of the present invention, the following ink sets may be mentioned: in the above-described constitution, an ink set wherein the first component may contain a cationic substance or at least one selected from polyvalent metal ions and salts thereof; an ink set wherein the polyvalent metal used in this case in particular may be at least one selected from Ca, Cu, Ni, Mg, Zn, Ba, Al, Fe, Cr and Y; an ink set wherein the coloring material in the ink may contain either an anionic dye or a pigment to the surface of which an anionic group is chemically bonded; and an ink set wherein the ink may contain a pigment as the coloring material and additionally an anionic dispersing agent.

Besides the above ink sets, the following ink sets may be mentioned: an ink set wherein the second component may be one that causes the water-soluble high-molecular compound to gel or crosslink; an ink set wherein the water-soluble high-molecular compound may have a hydroxyl group; an ink set wherein the water-soluble high-molecular compound may be polyvinyl alcohol; in this case, an ink set wherein the second component may be boric acid or a salt thereof; an ink set wherein the water-soluble high-molecular compound may have an acetoacetyl group; and in this case, an ink set wherein the second component may be adipic dihydrazide.

BRIEF DESCRIPTION OF THE DRAWINGS

FIGS. 1A, 1B, 1C, 1D and 1E schematically illustrate an inkjet recording process after ink-jet coating according to the present invention.

FIGS. 3A, 3B, 3C and 3D schematically illustrate an ink-jet recording process after roller coating according to the present invention.

DESCRIPTION OF THE PREFERRED EMBODIMENTS

Figure 2A:
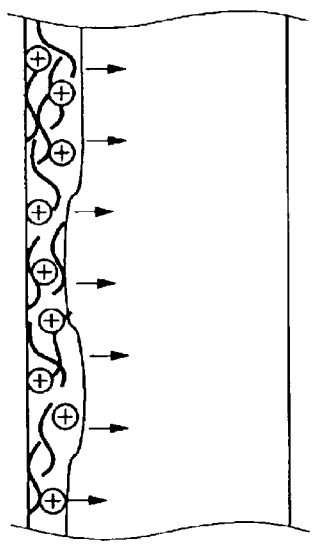
FIGS. 2A, 2B and 2C illustrate recording mechanism according to the present invention.
Figure 2B:
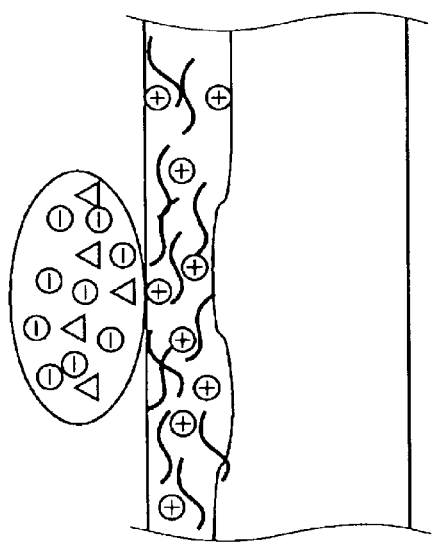
Figure 2C:
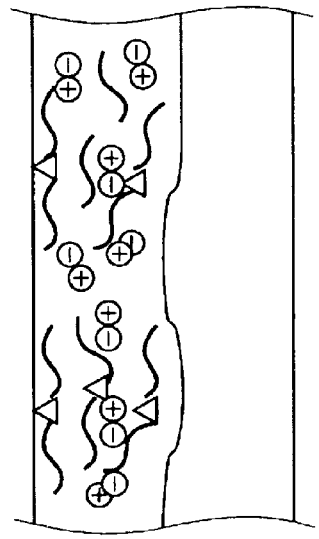

The present invention will hereinafter be described in more detail by the preferred embodiments.

According to the present invention, in the ink and reactive liquid having the above respective features, a substance (second component) reacting with a water-soluble high-molecular compound in the reactive liquid to destabilize it is contained in the ink, whereby adhesion between an aggregate of the coloring material and the surface of a recording medium, adhesion between aggregates of the coloring material, and rub-off resistance of a printed area after printing are easily improved on the recording medium by a liquid—liquid reaction.

The reason why such an effect is developed by the above-described constitution is considered to be attributable to the fact that the reactive liquid and ink on the recording medium are in the following successive states (see FIGS. 1A to 1E). Since the reactive liquid 1 applied to the recording medium 2 prior to the application of the ink contains the water-soluble high-molecular compound, the reactive liquid is rapidly thickened with evaporation of water after the application thereof. Therefore, the water-soluble high-molecular compound and cationic substance in the reactive liquid 3 are present in the vicinity of the surface of the recording medium (FIGS. 1A and 1B). The ink applied then comes into contact with the components in the reactive liquid in the vicinity of the surface of the recording medium, so that a reaction between the coloring material and the cationic substance and a reaction between the high-molecular compound and the gelling agent take place. At this time, the high-molecular compound is present around a place where the coloring material reacts with the cationic substance, so that aggregation of the coloring material is moderately controlled. Therefore, the aggregate 5 of the coloring material is not localized on the surface of the recording medium, but exists in the interior of the recording medium and in the vicinity of the surface thereof. Around the aggregate of the coloring material, a reaction such as gelling or crosslinking takes place between the water-soluble high-molecular compound and the substance reacting with the high-molecular compound to destabilize it, thereby forming a reaction product of a network structure in a three-dimensional direction (FIGS. 1C to 1E). As a result, the water-soluble high-molecular compound gelled or crosslinked in the network structure is considered to exhibit a function of improving the adhesion between the aggregate of the coloring material and the surface of the recording medium and between the aggregates of the coloring material. Since the reaction of the water-soluble high-molecular compound with the substance reacting with the high-molecular compound to destabilize it requires no external energy such as heat or light, a problem that the apparatus used is complicated is also not caused. When the surface tension of the reactive liquid is controlled to a range of from 25 mN/m (dyn/cm) to 35 mN/m (dyn/cm), the amount of the reactive liquid applied can be made less than that of the ink. When the surface tension is controlled to a range of from 35 mN/m (dyn/cm) to 50 mN/m (dyn/cm), the reaction of the reactive liquid with the ink is allowed to effectively progress because the fixing of the reactive liquid is not completed at the point of time the ink has been applied after the application of the reactive liquid. Accordingly, even when the cationic component in the reactive liquid is reduced or not contained, the same effect can be brought about.

As described previously, it has been found according to the investigation by the present invention that the conventional rub-off resistance of the resulting image achieved by a reaction of a coloring material in an ink with a substance reacting with the coloring material to form an aggregate of the coloring material, for example, a polyvalent metal ion or the like contained in the reactive liquid can be somewhat improved by containing the substance having binding ability in either the ink or the reactive liquid. According to the process of the present invention, in which the above-described water-soluble high-molecular compound and the substance (second component) reacting with the water-soluble high-molecular compound to destabilize it are used in combination, an effect that the development time of the rub-off resistance can be extremely shortened is brought about, so that a troublesome problem such as image soiling upon double-side printing can be effectively prevented.

The respective components making up the ink set according to the present invention will now be described to describe the present invention in detail. The ink set according to the present invention is a set composed of a water-based ink and a water-based reactive liquid. The water-based ink contains a coloring material in a state dissolved or dispersed in an aqueous medium. The water-based reactive liquid contains a first component for insolubilizing or aggregating the coloring material in the ink by mixing with the water-based ink. In addition to such constitution, the water-based reactive liquid contains a water-soluble high-molecular compound in a state dissolved therein, and the ink contains a second component, which is not insolubilized by the first component and coloring material, in a state dissolved therein. This water-soluble high-molecular compound is not insolubilized by the first component and coloring material but is insolubilized by the second component. Accordingly, the water-soluble high-molecular compound and the second component which characterize the present invention and are separately contained in the water-based reactive liquid and the water-based ink are first described, the coloring material which fulfills an important role in the formation of the aggregate of the coloring material together with these components and is contained in the water-based ink, and the first component contained in the water-based reactive liquid are then described, and other components making up the water-based ink and water-based reactive liquid are lastly described.

(Component Contained in Either Ink or Reactive Liquid)
Water-Soluble High-Molecular Compound:

The water-soluble high-molecular compound added to the reactive liquid is preferably a nonionic substance that does not participate in the insolubilizing reaction of the first component contained in the reactive liquid with the coloring material contained in the ink. Specifically, such water-soluble high-molecular compounds include compounds having a hydroxyl group, for example, saccharides, celluloses, acrylic polymers, vinyl acetate-acrylic copolymers, polyvinyl compounds and compounds having an acetoacetyl group.

Specific examples of water-soluble high-molecular compounds preferably usable in the present invention include polyacrylamide, polyvinyl pyrrolidone, water-soluble celluloses such as carboxymethyl cellulose, hydroxymethyl cellulose and hydroxypropyl cellulose, poly(vinyl methyl ether), polyvinyl acetal, and polyvinyl alcohol. It goes without saying that the water-soluble high-molecular compounds are not limited thereto. Resins with an anionic unit or cationic unit added to these water-soluble high-molecular compounds may also be used so far as the respective basic performance of the ink and reactive liquid can be retained. Further, while the above-mentioned water-soluble high-molecular compounds are preferably used, a dispersion such as a latex or emulsion may also be used in the present invention. No particular limitation is imposed on the content of the water-soluble high-molecular compound added to either the ink or the reactive liquid so far as it is within a range exhibiting the rub-off resistance of the resulting print.

Second Component:

As the second component added to the ink, it is necessary to select one causing a reaction such as gelling or crosslinking when mixed with the water-soluble high-molecular compound. Specifically, when a compound having a hydroxyl group, such as polyvinyl alcohol, is used as the water-soluble high-molecular compound, a gelling agent or crosslinking agent, for example, boric acid or sodium borate, may be preferably used as the second component. When a compound having an acetoacetyl group is used as the water-soluble high-molecular compound, for example, adipic dihydrazide may be mentioned as the second component. However, it goes without saying that the present invention is not limited thereto. No particular limitation is imposed on the content of such a second component as described above so far as it is within a range not impairing the stability of the ink.

(Component Contained in Reactive Liquid)

The water-based reactive liquid making up the ink set according to the present invention is required to contain the first component for insolubilizing or aggregating the coloring material in the water-based ink by mixing with the ink. In the present invention, the reactive liquid containing such a first component is used in the formation of an image, whereby the stability of the coloring material stably dissolved or dispersed in the aqueous medium is destroyed to aggregate the coloring material, thereby forming an aggregate of the coloring material to provide a high-quality print. The first component used in this case is preferably a cationic substance or contains at least one selected from a polyvalent metal ion or a salt thereof.

Polyvalent Metal Ion or Salt Thereof:

Specific examples of polyvalent metal ions usable in the reactive liquid include divalent metal ions such as $Ca^{2+}$, $Cu^{2+}$, $Ni^{2+}$, $Mg^{2+}$, $Zn^{2+}$ and $Ba^{2+}$, and trivalent metal ions such as $Al^{3+}$, $Fe^{3+}$, $Cr^{3+}$ and $Y^{3+}$. The salt of the polyvalent metal ion is a metal salt composed of any of such polyvalent metal ions as mentioned above and an anion bonded to the polyvalent metal ion and is required to be soluble in water. Examples of the anion for forming the salt include $SO_4^{2-}$, $Cl^-$, $CO_3^{2-}$, $NO_3^-$, $I^-$, $Br^-$, $ClO_3^-$, $CH_3COO^-$ and $HCOO^-$. It goes without saying that the present invention is not limited to these compounds.

Taking the effect of the present invention into consideration, the content of the metal salt in the reactive liquid is preferably from 0.01 to 20% by mass based on the total mass of the reactive liquid. The reactive liquid preferably contains no coloring material and is transparent, but it is not always required not to exhibit absorption in a visible range. In other words, it may exhibit absorption in the visible range so far as the resulting image is substantially not affected.

Cationic Substance:

The cationic substance usable in the reactive liquid is such that falls within the scope of the present invention and is soluble in water. Specific examples of low-molecular cationic substances include compounds of the primary, secondary and tertiary amine salt types, such as hydrochlorides and acetates of laurylamine, coconut amine, stearylamine, rosin amine and the like, and compounds of the quaternary ammonium salt type, such as lauryltrimethyl-ammonium chloride, lauryldimethyl-benzylammonium chloride, benzyltributylammonium chloride and benzalkonium chloride. Compounds of the pyridinium salt type, such as cetylpyridinium chloride and cetylpyridinium bromide, imidazoline type cationic compounds such as 2-heptadecenylhydroxyethylimidazoline, and dihydroxyethylstearylamine that is an ethylene oxide adduct of higher alkylamines may also be mentioned.

As specific examples of the high-molecular cationic substances, may be mentioned polyallylamine hydrochloride, polyamine sulfone hydrochloride, polyvinylamine to hydrochloride and chitosan acetate. Besides, compounds obtained by partially cationizing a nonionic high-molecular substance, such as copolymers of vinylpyrrolidone and an aminoalkylalkylate quaternary salt and copolymers of acrylamide and an aminomethylacrylamide quaternary salt may also be mentioned. It goes without saying that the high-molecular cationic substances are not limited to these substances within the scope of the present invention. Taking the effect of the present invention into consideration; the content of the above-described compounds and high-molecular substances in the reactive liquid is preferably from 0.1 to 20% by mass based on the total mass of the reactive liquid.

Aqueous Medium:

Examples of the aqueous medium used in the reactive liquid include water and mixed solvents of water and a water-soluble organic solvent. As the water-soluble organic solvent, particularly preferred is one having an effect of preventing the drying of the resulting reactive liquid. Specific examples thereof include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, thiodiglycol, hexylene glycol and diethylene glycol; lower alkyl ether acetates such as polyethylene glycol monomethyl ether acetate; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N-methyl-2-pyrrolidone; 2-pyrrolidone; and 1,3-dimethyl-2-imidazolidinone. These water-soluble organic solvents may be used either singly or in any combination thereof. As the water, it is desirable to use deionized water.

No particular limitation is imposed on the content of such water-soluble organic solvents as described above in the reactive liquid according to the present invention. However, it is preferably within a range of from 3 to 50% by mass based on the total mass of the reactive liquid. The content of water in the reactive liquid is preferably within a range of from 50 to 95% by mass based on the total mass of the reactive liquid. Besides the above components, a surfactant, an antifoaming agent, an antiseptic, a mildewproofing agent and the like may be suitably added to the reactive liquid to provide it as a reactive liquid having desired physical properties.

As a particularly preferable method for applying the reactive liquid to the recording medium upon formation of an image, may be mentioned an ink-jet system by which the reactive liquid can be selectively applied only to an image forming region, to which the ink is applied, and the vicinity of the image forming region. However, it goes without saying that the reactive liquid may be applied by a method of applying it to the whole surface of the recording medium by roller coating or the like if the reactive liquid has no or poor ink-jet suitability.

(Component of Water-based Ink)

Coloring Material:

When the reactive liquid having the above-described constitution is used in formation of an image in combination with an ink, in which a coloring material is dispersed or dissolved in an aqueous medium by an ionic group, an aggregate of the coloring material can be formed on a recording medium by bringing them into contact with each other to form a high-quality image. Accordingly, examples of the coloring material making up the water-based ink according to the present invention include anionic dyes, pigments to the surfaces of which an anionic group is chemically bonded, and modes containing a pigment as a coloring material and additionally an anionic dispersing agent. The pigments as used herein include microcapsulated pigments and colored resins. These coloring materials will hereinafter be described in detail.

Pigment:

Examples of pigments used in the present invention include carbon black and organic pigments.

Carbon Black:

Examples of carbon black include carbon black pigments such as furnace black, lamp black, acetylene black and channel black. As specific examples thereof, may be mentioned Raven 7000, Raven 5750, Raven 5250, Raven 5000, Raven 3500, Raven 2000, Raven 1500, Raven 1250, Raven 1200, Raven 1190 ULTRA-II, Raven 1170 and Raven 1255 (all, products of Columbian Carbon Japan Limited), Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400 and Vulcan XC-72R (all, products of CABOT CO.), Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V and Special Black 6, Special Black 5, Special Black 4A and Special Black 4 (all, products of Degussa AG), and No. 25, No. 33, No. 40, No. 47, No. 52, No. 900, No. 2300, MCF-88, MA600, MA7, MA8 and MA100 (all, products of MITSUBISHI CHEMICAL CORPORATION). However, the present invention is not limited thereto, and any carbon black conventionally known may be used. Magnetic fine particles such as magnetite and ferrite, titanium black, and the like may also be used as black pigments.

Organic Pigment:

Examples of organic pigments include insoluble azo pigments such as Toluidine Red, Toluidine Maroon, Hansa Yellow, Benzidine Yellow and Pyrazolone Red, soluble azo pigments such as Lithol Red, Helio Bordeaux, Pigment Scarlet and Permanent Red 2B, derivatives from vat dyes such as alizarin, indanthron and Thioindigo Maroon, phthalocyanine pigments such as Phthalocyanine Blue and Phthalocyanine Green, quinacridone pigments such as Quinacridone Red and Quinacridone Magenta, perylene pigments such as Perylene Red and Perylene Scarlet, isoindoline pigments such as Isoindoline Yellow and Isoindoline Orange, imidazolone pigments such as Benzimidazolone Yellow, Benzimidazolone Orange and Benzimidazolone Red, pyranthrone pigments such as Pyranthrone Red and Pyranthrone Orange, thioindigo pigments, condensed azo pigments, Flavanthrone Yellow, Acylamide Yellow, Quinophthalone Yellow, Nickel Azo Yellow, Copper Azomethine Yellow, Perinone Orange, Anthrone Orange, Dianthraquinonyl Red, Dioxazine Violet, etc.

When organic pigments are indicated by COLOR INDEX (C.I.) numbers, C.I. Pigment Yellow 12, 13, 14, 17, 20, 24, 74, 83, 86, 93, 109, 110, 117, 120, 125, 128, 137, 138, 147, 148, 151, 153, 154, 166 and 168, C.I. Pigment Orange 16, 36, 43, 51, 55, 59 and 61, C.I. Pigment Red 9, 48, 49, 52, 53, 57, 97, 122, 123, 149, 168, 175, 176, 177, 180, 192, 215, 216, 217, 220, 223, 224, 226, 227, 228, 238 and 240, C.I. Pigment Violet 19, 23, 29, 30, 37, 40 and 50, C.I. Pigment Blue 15, 15:3, 15:1, 15:4, 15:6, 22, 60 and 64, C.I. Pigment Green 7 and 36, and C.I. Pigment Brown 23, 25 and 26 may be exemplified. It goes without saying that conventionally known organic pigments may also be used in addition to the above pigments.

Dispersing Agent:

When such carbon black or an organic pigment as described above is used as a coloring materials, a dispersing agent is preferably used in combination therewith. As the dispersing agent, preferred is one capable of stably dispersing the pigment in an aqueous medium by an action of an anionic group. Specific examples of the dispersing agent include styrene-acrylic acid copolymers, styrene-acrylic acid-alkyl acrylate terpolymers, styrene-maleic acid copolymers, styrene-maleic acid-alkyl acrylate terpolymers, styrene-methacrylic acid copolymers, styrene-methacrylic acid-alkyl acrylate terpolymers, styrene-maleic acid half ester copolymers, vinylnaphthalene-acrylic acid copolymers, vinylnaphthalene-maleic acid copolymers, styrene-maleic anhydride-maleic acid half ester terpolymers, and salts thereof Of these, those having a weight average molecular weight ranging from 1,000 to 30,000, particularly from 3,000 to 15,000 are preferred.

Self-dispersing Pigment:

In the present invention, a pigment, which can be obtained by bonding an ionic group (anionic group) to the surface of the pigment can be dispersed in an aqueous medium without using any dispersing agent, or the so-called self-dispersing pigment may also be used as the coloring material. As an example of such a pigment, may be mentioned self-dispersing carbon black. As an example of the self-dispersing carbon black, carbon black with an anionic group bonded to the surface thereof (anionic CB) may be mentioned. Description will hereinafter be given taking carbon black as an example.

Anionic CB:

Examples of the anionic carbon black include those to the surfaces of which at least one anionic group selected from the group consisting of —COO(M2), —SO$_3$(M2), —PO$_3$H (M2) and —PO$_3$(M2)$_2$ is bonded. In these formulae, M2 is hydrogen, alkali metal, ammonium or organic ammonium.

Among these, carbon black obtained by bonding COO (M2) or —SO$_3$(M2) to the surface of carbon black to be anionically charged can be particularly preferably used in the present invention because it has good dispersibility in the resulting ink. Specific examples of the alkali metal among those indicated as M2 in the hydrophilic group include Li, Na, K, Rb and Cs. Specific examples of the organic ammonium include methyl ammonium, dimethylammonium, trimethylammonium, ethylammonium, diethyl ammonium, triethylammonium, methanolammonium, dimethanolammonium and trimethanolammonium.

When an ink containing the self-dispersing carbon black, in which M2 is ammonium or organic ammonium, is used, the water fastness of the resulting recorded image can be further improved. Such carbon black is particularly preferred in this respect. The reason for it is considered to be attributable to the influence of ammonia evaporated by decomposition of ammonium upon application of such an ink to a recording medium. The self-dispersing carbon black, in which M2 is ammonium, can be obtained by, for example, replacing M2 of self-dispersing carbon black, in which M2 is an alkali metal, by ammonium by means of an ion-exchange method, or adding an acid to the self-dispersing carbon black to convert to an H type and then adding ammonium hydroxide to convert M2 to ammonium.

Examples of processes for production of the anionically charged self-dispersing carbon black include a process, in which carbon black is subjected to an oxidizing treatment with sodium hypochlorite. For example, a —COONa group can be chemically bonded to the surface of carbon black by this process.

The above-described various hydrophilic groups may be directly bonded to the surface of carbon black or indirectly bonded to the surface of carbon black by interposing another atomic group between the surface of carbon black and the hydrophilic group. Examples of the other atomic group include linear or branched alkylene groups having 1 to 12 carbon atoms, a phenylene group which may be substituted, and a naphthylene group which may be substituted. Examples of substituent groups on the phenylene group and naphthylene group include linear or branched alkyl groups having 1 to 6 carbon atoms. Specific examples of a combination of another atomic group and the hydrophilic group include —C$_2$H$_4$COO(M2), —Ph—SO$_3$(M2) and —Ph—COO(M2) (wherein Ph is a phenyl group).

In the present invention, two or more kinds of self-dispersing carbon black may be suitably selected from among the above-described self-dispersing carbon black and used as the coloring material for the ink. The amount of the self-dispersing carbon black added into the ink is preferably within a range of from 0.1 to 15% by mass, particularly from 1 to 10% by mass based on the total mass of the ink. When the amount of the self-dispersing carbon black falls within this range, a sufficient dispersed state can be retained when the self-dispersing carbon black is contained in the ink. A dye may also be added as a coloring material in addition to the self-dispersing carbon black for purposes of adjustment of color tone of the resulting ink, and the like.

Colored Fine Particles/Microcapsulated Pigment:

Besides the above-described coloring materials, pigments microcapsulated with a polymer or the like and colored fine particles obtained by covering resin particles with a coloring material may also be used as coloring materials. Microcapsules naturally have dispersibility in an aqueous medium. However, such a dispersing agent as described above may be additionally caused to coexist in the ink for the purpose of increasing dispersion stability. When the colored fine particles are used as a coloring material, it is preferable to use the above-described dispersing agent or the like.

Dye:

The ink used in the present invention may contain an anionic dye as the coloring material. Specific examples thereof include:

Coloring Materials for Yellow:
- C.I. Direct Yellow 8, 11, 12, 27, 28, 33, 39, 44, 50, 58, 85, 86, 87, 88, 89, 98, 100, 110 and 132;
- C.I. Acid Yellow 1, 3, 7, 11, 17, 23, 25, 29, 36, 38, 40, 42, 44, 76, 98 and 99;
- C.I. Reactive Yellow 2, 3, 17, 25, 37 and 42; and
- C.I. Food Yellow 3;

Coloring Material for Red:
- C.I. Direct Red 2, 4, 9, 11, 20, 23, 24, 31, 39, 46, 62, 75, 79, 80, 83, 89, 95, 197, 201, 218, 220, 224, 225, 226, 227, 228, 229 and 230;
- C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265 and 289;
- C.I. Reactive Red 7, 12, 13, 15, 17, 20, 23, 24, 31, 42, 45, 46 and 59; and
- C.I. Food Red 87, 92 and 94;

Coloring Materials for Blue:
- C.I. Direct Blue 1, 15, 22, 25, 41, 76, 77, 80, 86, 90, 98, 106, 108, 120, 158, 163, 168, 199 and 226;
- C.I. Acid Blue 1, 7, 9, 15, 22, 23, 25, 29, 40, 43, 59, 62, 74, 78, 80, 90, 100, 102, 104, 117, 127, 138, 158 and 161;
- C.I. Reactive Blue 4, 5, 7, 13, 14, 15, 18, 19, 21, 26, 27, 29, 32, 38, 40, 44 and 100;

Coloring Materials for Black:
- C.I. Direct Black 17, 19, 22, 31, 32, 51, 62, 71, 74, 112, 113, 154, 168 and 195;
- C.I. Acid Black 2, 48, 51, 52; 110, 115, 156;
- C.I. Food Black 1 and 2.

Aqueous Medium:

No particular limitation is imposed on the aqueous medium dissolving or dispersing such a coloring material as described above therein, and the same aqueous medium as described above as the aqueous medium used in the reactive liquid may be used. When the color ink is applied to a recording medium by an inkjet method (for example, Bubble-Jet (trademark) method), the ink may preferably be prepared so as to have the desired viscosity and surface tension for purpose of achieving excellent ink-jet ejection properties as described above.

Examples of the aqueous medium used in the inks according to the present invention include water and mixed solvents of water and a water-soluble organic solvent. As the water-soluble organic solvent, particularly preferred is one having the effect of preventing the drying as exemplified in the reactive liquid. Specific examples thereof include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, thiodiglycol, hexylene glycol and diethylene glycol; lower alkyl ether acetates such as polyethylene glycol monomethyl ether acetate; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N-methyl-2-pyrrolidone; 2-pyrrolidone; and 1,3-dimethyl-2-imidazolidinone. These water-soluble organic solvents may be used either singly or in any combination thereof. As the water, it is desirable to use deionized water.

No particular limitation is imposed on the content of such water-soluble organic solvents as described above in the ink according to the present invention. However, it is preferably within a range of from 3 to 50% by mass based on the total mass of the ink. The content of water in the ink is preferably within a range of from 50 to 95% by mass based on the total mass of the ink. Besides the above components, a surfactant, an antifoaming agent, an antiseptic, a mildewproofing agent and the like, not to mention a humectant, may be added to the ink, as needed, to provide it as an ink having desired physical properties. In the case where the resulting ink is used in, for example, ink-jet recording, the content of the coloring material in the ink may be suitably selected in such a manner that the ink has excellent ink-jet ejection properties and desired color tone and density. However, as a standard, it is preferably within a range of, for example, from 1 to 50% by mass based on the total mass of the ink.

Ink Set:

When the ink described above and the reactive liquid described above are combined with each other to make up the ink set according to the present invention, no particular limitation is imposed on the tint of the ink. The ink may be provided as an ink is showing a color tone selected from, for example, yellow, magenta, cyan, red, green, blue and black. Specifically, the coloring material may be suitably selected for use from among the above-mentioned coloring materials so as to become an ink of a desired color tone. The ink combined with the reactive liquid is not limited to one ink, and an embodiment that two or more inks of different colors are combined to provide an ink set suitable for use in formation of multi-color images is preferred. In this case, it is only necessary for at least one of two or more inks to react with the reactive liquid.

More specifically, any one of the inks making up the ink set is required to be an ink, in which its coloring material is dissolved or dispersed in an aqueous medium by an action of an ionic group, and an aggregate of the coloring material is formed when the ink comes into contact with the reactive liquid on a recording medium. It goes without saying that all the inks making up the ink set may be provided as inks having such a function as described above. According to such an ink set, bleeding caused at the time inks of different colors are applied adjoiningly to a recording medium, which becomes a problem in the case where a multi-color image is formed by an ink-jet recording apparatus, can be prevented. More specifically, the bleeding that becomes a problem in a multi-color image by ink-jet tends to become particularly marked between a black ink and another color ink (for example, at least one ink selected from yellow, magenta, cyan, red, green and blue inks). In the present invention, it is therefore particularly preferred to prepare at least a black ink as an ink interacting with the reactive liquid.

Recording Process:

The process for forming an image on a recording medium according to the present invention comprises the steps of (i) applying the water-based ink making up the above-described ink set to a recording medium by an ink-jet recording method; and (ii) applying the water-based reactive liquid making up the ink set to the recording medium, wherein the step (i) and the step (ii) are conducted in such a manner that the water-based ink comes into contact with the water-based reactive liquid on the recording medium. When the ink comes into contact with the reactive liquid according to such a process, an aggregate of the coloring material is rapidly formed without extremely raising reactivity between the reactive liquid and the ink. As a result, a high-quality image having high image density and high coloring, having improved clarity at a contour portion of the image, free from occurrence of bleeding and having excellent resistance to strike-through can be formed. The term "strike-through" as used herein means exudation of the coloring material to a back surface from the printing surface, which is caused by excessive penetration of the ink. When the reactive liquid and the ink are applied to the recording medium, it is accordingly preferable to apply the reactive liquid to at least an area of the recording medium, to which the ink is applied. It is more preferable to apply the reactive liquid to an area wider than the area of the recording medium, to which the ink is applied.

In the image forming process according to the present invention, the application of the ink and reactive liquid making up the ink set may be conducted by any method. For example, the application of both ink and reactive liquid is conducted by an ink-jet recording method, whereby the reactive liquid can be impacted on only a position where the ink is impacted. However, the present invention is not limited to this method. The application of the reactive liquid may be conducted by a publicly known method such as roller coating. A specific method will be described subsequently.

With respect to the order of the application, various methods such as the following methods are considered.
a: a method in which the ink is ejected after the reactive liquid is applied;
b: a method in which the reactive liquid is applied after the ink is ejected;
c: a method in which the reactive liquid is applied after the ink is ejected, and the ink is additionally ejected;
d: a method in which the ink is ejected after the reactive liquid is applied, and the reactive liquid is additionally applied.

As described above, the order of the application of the ink and reactive liquid to the recording medium may be suitably selected from, for example, the above-described methods. In view of the object of the present invention, the application may preferably be conducted by the method a or d at least including the step of applying the reactive liquid to the recording medium prior to the ejection of the ink.

In the present invention, a plurality of ink sets comprising the reactive liquid and ink of the constitution according to the present invention, or the ink set of the reactive liquid and ink of this constitution and inks of another constitution are combined, whereby ink sets that can be suitably used in formation of high-quality color images in any event are provided. When such an ink set is used to conduct recording using the ink of the constitution according to the present invention as a black ink in such a manner that a black image area adjoins a color image area, occurrence of bleeding can be extremely effectively prevented.

Figure 4:
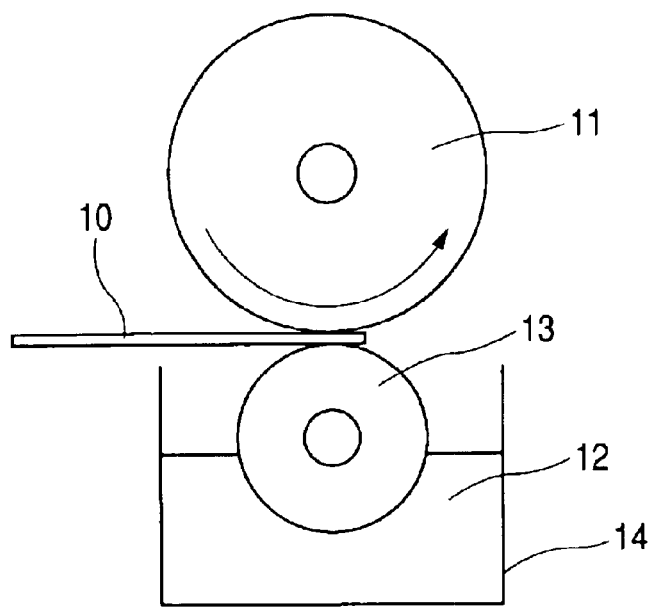
FIG. 4 illustrates a specific example of the roller coating according to the present invention.
Figure 5:
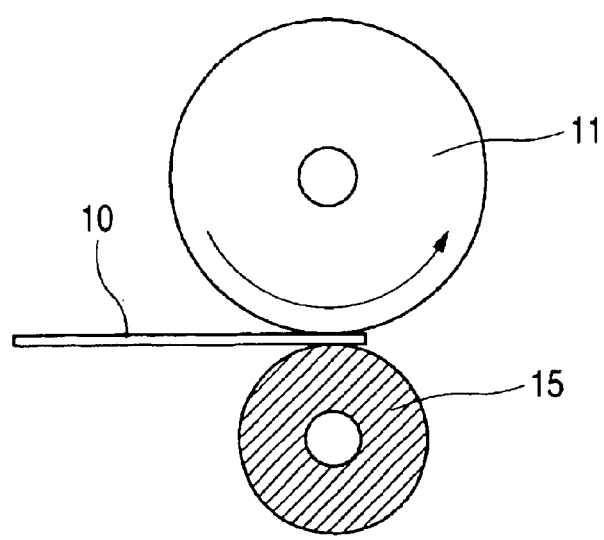
FIG. 5 illustrates another specific example of the roller coating according to the present invention.

The application of the reactive liquid may also be conducted by the ink-jet system like the case of the ink as described above. It goes without saying that any conventionally known application method, such as a coating method such as bar coating, roller coating or spray coating, may be used. Described in more detail, from the viewpoint of some modification on the recording medium that is an object of the present invention, it may be said that modification of the whole surface of the recording medium is preferred for surely exhibiting the effect of the present invention. Taking the above fact into consideration, the application of the reactive liquid to the recording medium is not always required to be conducted by the ink-jet system like the ink. It may be rather preferred in some cases that the whole surface of the recording medium is modified by such roller coating as illustrated in FIGS. 3A to 3D and FIG. 4 or 5, or bar coating, spray coating or the like. In FIGS. 4 and 5, reference numeral 10 denotes a recording medium, 11 a counter roller, 12 a reactive liquid, 13 a liquid applicating roller, 14 a reactive liquid bath, and 15 a reactive liquid containing roller. Ink properties; ink-jet ejection properties and penetrability into recording medium:

The ink set according to the present invention can be suitably used as an ink set for ink-jet recording. Ink-jet recording methods include, for example, a recording method in which mechanical energy is caused to act on an ink to eject droplets of the ink, and a recording method in which thermal energy is applied to an ink to eject droplets of the ink by bubbling of the ink. These methods are particularly preferred as methods for applying the reactive liquid and ink according to the present invention to the recording medium.

By the way, when the reactive liquid and ink according to the present invention are used for ink-jet recording, the reactive liquid and ink are adjusted so as to have such ink-jet properties that they can be ejected from an ink-jet head.

From the viewpoint of ejectability from an ink-jet head, a liquid used preferably has, for example, a viscosity within a range of from 1 to 15 cP, particularly from 1 to 5 cP and a surface tension within a range of at least 25 mN/m (dyn/cm), particularly from 25 to 50 mN/m (dyn/cm).

In particular, the reactive liquid preferably has a surface tension within a range of from 25 to 35 mN/m (dyn/cm) because it is preferably applied to an area of the recording medium, to which the ink is applied.

When the reactive liquid is applied to the recording medium by a roller coating or bar coating system, the reactive liquid desirably has a surface tension within a range of at least 20 mN/m (dyn/cm), particularly from 25 to 35 mN/m (dyn/cm) and a viscosity within a range of at most 100 cP, particularly from 5 to 60 cP from the viewpoints of the control of an amount applied and even coating on the recording medium.

The amount of the reactive liquid applied to the recording medium may be suitably adjusted according to the kind and amount of the first component for insolubilizing or aggregating the coloring material in the ink or the kind of the ink caused to react with it. However, when the amount applied is at least 0.5 g/m$^2$, a sufficient effect can be exhibited. In addition, an application amount of not more than 10 g/m$^2$ is more preferred from the viewpoint of the fixing property of the resulting recorded article. The amount may be more preferably more than 2 g/m$^2$, but not more than 5 g/m$^2$.

Embodiments of a recording head of an ejection system communicating a bubble with the air upon ejection, which can be suitably used in the present invention, include, for example, the so-called edge shooter type as described in, for example, Japanese Patent Registration No. 2783647 and the side shooter type effectively practiced in recent years.

In particular, the present invention has excellent effects in recording heads and recording apparatus of an ink-jet system that thermal energy is utilized to form a droplet to be ejected, thereby conducting recording, among the ink-jet recording systems.

With respect to the typical construction and principle thereof, those using the basic principle disclosed in, for example, U.S. Pat. Nos. 4,723,129 and 4,740,696 are preferred. This system may be applied to any of the so-called On-Demand type and continuous type. In particular, the On-Demand type is effective because at least one driving signal which corresponds to recording information and gives a rapid temperature rise exceeding film boiling is applied to an electrothermal converter arranged corresponding to a sheet or liquid path, in which a liquid (ink) is held, thereby causing the electrothermal converter to generate thermal energy to cause film boiling on the heat-acting surface of a recording head, so that a bubble can be formed in the liquid (ink) in response to the driving signal in a relation of one to one. The liquid (ink) is ejected through an ejection opening by the growth-contraction of this bubble to form at least one droplet. When the driving signal is applied in the form of a pulse, the growth-contraction of the bubble is suitably conducted in a moment, so that the ejection of the liquid (ink) excellent in responsiveness in particular can be achieved. It is therefore preferable to use such pulsed signals.

As the pulsed driving signal, such signals as described in U.S. Pat. Nos. 4,463,359 and 4,345,262 are suitable. When the conditions described in U.S. Pat. No. 4,313,124, which is an invention relating to the rate of temperature rise on the heat-acting surface, are adopted, particularly excellent recording can be conducted.

As the construction of the recording head, such combined constructions (linear liquid flow path or perpendicular liquid flow path) of ejection openings, a liquid flow path and electrothermal converters as disclosed in the above-described publications, and also constructions based on U.S. Pat. Nos. 4,558,333 and 4,459,600, which disclose the construction that a heat-acting portion is arranged in a curved region, may also be included in the present invention.

In addition, constructions based on Japanese Patent Application Laid-Open No. S59-123670, which discloses the construction that a slit common to a plurality of electrothermal converters is used as an ejection part of the recording head, and Japanese Patent Application Laid-Open No. S59-138461, which discloses the construction that an opening absorbing a pressure wave of thermal energy is provided in opposition to an ejection part, may also be effective for the present invention.

Further, as a full-line type recording head having a length corresponding to the longest width of the recording media, both the construction that the length is met by such a combination of plural recording heads as disclosed in the above-described publications and the construction having one recording head integrally formed may be used, and the above-described effects of the present invention can be more effectively exhibited.

In addition, the present invention is effective even when a replaceable, chip type recording head in which electrical connection to an apparatus body and the feed of an ink from the apparatus body become feasible by installing in the apparatus body, or a cartridge type recording head in which an ink tank is provided integrally in a recording head itself is used.

Further, the addition of recovery means, preliminary auxiliary means, etc. to a recording head which are provided as part of the recording apparatus according to the present invention is preferred because the effects of the present invention can be further stabilized. Specifically, for the recording head, capping means, cleaning means, pressurizing or sucking means, preliminary heating means by electrothermal converters, other heating elements than these or combinations thereof, and preliminary ejection mode wherein ejection is separate from recording is conducted, may also be effective for stable recording.

As a recording mode of the recording apparatus, the present invention is extremely effective for not only recording mode using only main colors such as black, but also apparatus equipped with at least one of complex color of different colors and full color by color mixing.

In the above-described embodiments of the present invention, the inks have been described as liquid. However, inks solidified at room temperature or lower may also be used so far as they are softened or liquid at a temperature higher than room temperature, or exhibit a liquid phase upon application of recording signals used because it is typical in the above-described ink-jet systems that the temperature control of an ink itself is conducted to be within a range of from 30 to 70° C. to adjust the viscosity of the ink so as to fall within a stable ejection range.

In addition, inks that are liquefied by applying thermal energy according to recording signals and ejected as liquid inks, such as inks of which temperature rise by thermal energy is positively prevented by using the thermal energy as energy for phase change from a solid phase to a liquid phase and inks solidified in a state left to stand for the purpose of preventing evaporation of the inks, and inks of a nature that they are liquefied for the first time by thermal energy, such as those already beginning to solidify at the time they reach a recording medium, may also be applied to the present invention. In such a case, the inks may be in a form that they are opposed to electrothermal converters in a state retained as a liquid or solid in recesses or through-holes in a porous sheet as described in Japanese Patent Application Laid-Open No. S54-56847 or S60-71260. In the present invention, the above-described film boiling system is most effective for the above-described inks.

Furthermore, as forms of the recording apparatus according to the present invention, forms that the apparatus is integrally or separately provided as an image output terminal for information processing instruments such as word processors and computers, and forms such as copying machines combined with a reader and facsimiles having a transmitting-receiving function may also be adopted.

EXAMPLES

The present invention will hereinafter be described more specifically by the following Examples and Comparative Examples. However, the present invention is not limited to and by these examples so far as the subject matter of the present invention is not overstepped. Incidentally, all designations of part or parts and % as will be used in the following examples mean part or parts by mass and % by mass unless expressly noted.

Preparation of Reactive Liquid:

Reactive Liquids 1 to 5 were first prepared in the following manner.

Reactive Liquid 1:

The following components were mixed and thoroughly stirred into a solution. The resultant solution was then filtered under pressure through a microfilter (product of Fuji Photo Film Co., Ltd.) having a pore size of 1 mm, thereby preparing Reactive Liquid I. Reactive Liquid 1 had a surface tension of 32.1 mN/m and a viscosity of 35.5 cP.

| | |
|---|---|
| Yttrium nitrate (hexahydrate) | 7 parts |
| Polyvinyl alcohol (polymerization Degree: 1700; saponification degree: 88%) | 3 parts |
| Trimethylolpropane | 6 parts |
| Glycerol | 5 parts |

-continued

| | |
|---|---|
| Diethylene glycol | 5 parts |
| Acetylene glycol ethylene oxide Adduct (trade name: Acetylenol EH) | 1 part |
| Water | 73 parts. |

Reactive Liquid 2:

The following components were mixed and thoroughly stirred into a solution. The resultant solution was then filtered under pressure through a microfilter (product of Fuji Photo Film Co., Ltd.) having a pore size of 1 mm, thereby preparing Reactive Liquid 2. Reactive Liquid 2 had a surface tension of 37 mN/m and a viscosity of 4.1 cP.

| | |
|---|---|
| Yttrium nitrate (hexahydrate) | 7 parts |
| Trimethylolpropane | 6 parts |
| Glycerol | 5 parts |
| Diethylene glycol | 5 parts |
| Water | 77 parts. |

Reactive Liquid 3:

The following components were mixed and thoroughly stirred into a solution. The resultant solution was then filtered under pressure through a microfilter (product of Fuji Photo Film Co., Ltd.) having a pore size of 1 mm, thereby preparing Reactive Liquid 3. Reactive Liquid 3 had a surface tension of 32.5 mN/m and a viscosity of 58.1 cP.

| | |
|---|---|
| Calcium nitrate (tetrahydrate) | 10 parts |
| Polyvinyl alcohol (polymerization Degree: 1700; saponification degree: 88%) | 5 parts |
| Trimethylolpropane | 20 parts |
| Acetylene glycol ethylene oxide Adduct (trade name: Acetylenol EH) | 1 part |
| Water | 64 parts. |

Reactive Liquid 4:

The following components were mixed and thoroughly stirred into a solution. The resultant solution was then filtered under pressure through a microfilter (product of Fuji Photo Film Co., Ltd.) having a pore size of 1 mm, thereby preparing Reactive Liquid 4. Reactive Liquid 4 had a surface tension of 31.5 mN/m and a viscosity of 3.5 cP.

| | |
|---|---|
| Calcium nitrate (tetrahydrate) | 6 parts |
| Polyvinyl alcohol (polymerization Degree: 100; saponification degree: 88%) | 3 parts |
| Trimethylolpropane | 5 parts |
| Diethylene glycol | 5 parts |
| Acetylene glycol ethylene oxide Adduct (trade name: Acetylenol EH) | 1 part |
| Water | 80 parts. |

Reactive Liquid 5:

The following components were mixed and thoroughly stirred into a solution. The resultant solution was then filtered under pressure through a microfilter (product of Fuji Photo Film Co., Ltd.) having a pore size of 1 mm, thereby preparing Reactive Liquid 5. Reactive Liquid 5 had a surface tension of 32.5 mN/m and a viscosity of 3.2 cP.

| | |
|---|---|
| Yttrium nitrate (hexahydrate) | 7 parts |
| Sodium borate | 2 parts |
| Trimethylolpropane | 6 parts |
| Glycerol | 5 parts |
| Diethylene glycol | 5 parts |
| Acetylene glycol ethylene oxide Adduct (trade name: Acetylenol EH) | 1 part |
| Water | 74 parts. |

Preparation of Cyan Ink:

Ten parts of a pigment [C.I. Pigment Blue 15:3 (trade name: Fastgen Blue FGF, product of Dainippon Ink & Chemicals, Incorporated)], 20 parts of an anionic Polymer P-1 (styrene-acrylic acid copolymer, acid value: 200, weight average molecular weight: 10,000, aqueous solution having a solid content of 10%, neutralizing agent: potassium hydroxide) and 70 parts of purified water were mixed. A batch type vertical sand mill (manufactured by IMEX Co., Ltd.) was charged with the resultant mixture and 150 parts of zirconia beads having a diameter of 0.3 mm to conduct a dispersing treatment for 5 hours while cooling with water. The thus-obtained dispersion was subjected to a centrifugal separator to remove coarse particles, thereby obtaining Pigment Dispersion C1 having a solid content of about 12% and a weight average particle diameter of 100 nm as a final product. The thus-obtained Pigment Dispersion C1 was used to prepare a cyan ink in the following manner.

Cyan Ink 1:

The following components were mixed and thoroughly stirred into a solution. The resultant solution was then filtered under pressure through a microfilter (product of Fuji Photo Film Co., Ltd.) having a pore size of 3.0 mm, thereby preparing Cyan Ink 1. Cyan Ink 1 had a surface tension of 32.5 mN/m and a viscosity of 2.6 cP.

| | |
|---|---|
| Pigment Dispersion C1 | 30 parts |
| Sodium borate | 0.5 parts |
| Glycerol | 9 parts |
| Diethylene glycol | 6 parts |
| Acetylene glycol ethylene oxide Adduct (trade name: Acetylenol EH) | 1 part |
| Water | 53.5 parts. |

Cyan Ink 2:

The following components were mixed and thoroughly stirred into a solution. The resultant solution was then filtered under pressure through a microfilter (product of Fuji Photo Film Co., Ltd.) having a pore size of 3.0 mm, thereby preparing Cyan Ink 2. Cyan Ink 2 had a surface tension of 32.5 mN/m and a viscosity of 2.5 cP.

| | |
|---|---|
| Pigment Dispersion C1 | 30 parts |
| Glycerol | 9 parts |
| Diethylene glycol | 6 parts |
| Acetylene glycol ethylene oxide Adduct (trade name: Acetylenol EH) | 1 part |
| Water | 54 parts. |

Cyan Ink 3:

The following components were mixed and thoroughly stirred into a solution. The resultant solution was then filtered under pressure through a microfilter (product of Fuji Photo Film Co., Ltd.) having a pore size of 3.0 mm, thereby preparing Cyan Ink 3. Cyan Ink 3 had a surface tension of 34.5 mN/m and a viscosity of 3.5 cP.

| | |
|---|---|
| Pigment Dispersion C1 | 30 parts |
| Polyvinyl alcohol (polymerization Degree: 100; saponification degree: 88%) | 2 parts |
| Glycerol | 9 parts |
| Diethylene glycol | 6 parts |
| Acetylene glycol ethylene oxide Adduct (trade name: Acetylenol EH) | 1 part |
| Water | 52 parts. |

Example 1

Cyan Ink 1 and Reactive Liquid 1 prepared above were combined with each other to prepare an ink set according to this example.

Example 2

Cyan Ink 1 and Reactive Liquid 3 prepared above were combined with each other to prepare an ink set according to this example.

Example 3

Cyan Ink 1 and Reactive Liquid 4 prepared above were combined with each other to prepare an ink set according to this example.

Comparative Example 1

Cyan Ink 2 and Reactive Liquid 2 prepared above were combined with each other to prepare an ink set according to COMPARATIVE EXAMPLE 1.

Comparative Example 2

Cyan Ink 3 and Reactive Liquid 5 prepared above were combined with each other to prepare an ink set according to COMPARATIVE EXAMPLE 2.

The ink sets prepared above were separately used to form an image in the following manner. The respective reactive liquids were first separately applied to the following three printing media by means of a roller coating system as illustrated in FIG. 4 for the reactive liquids according to EXAMPLES 1 and 2 and COMPARATIVE EXAMPLE 1 and by means of an ink-jet recording apparatus BJS700 (trade name, manufactured by Canon Inc.) for the reactive liquid according to EXAMPLE 3. Amounts applied at this time were each 2.4 g/m². Thereafter, an ink-jet recording apparatus BJS700 (trade name, manufactured by Canon Inc.) having an On-Demand type multi-recording head, wherein an ink is ejected by applying thermal energy to the ink according to recording signals, was used to conduct printing with the respective cyan inks. The images thus obtained were evaluated in accordance with the following method. The evaluated item is described below. As the printing media, three kinds of commercially available paper for copying, bond paper and regenerated paper were used.

Incidentally, with respect to COMPARATIVE EXAMPLE 2, no printing evaluation was performed because turbidity was observed after the preparation of the reactive liquid.

(1) Rub-off resistance:

Upon elapsed time of 1 minute after MS gothic, 14-point characters and a 2-cm×2-cm solid area were printed, each printed area was rubbed with a finger to evaluate it as to rub-off resistance.

As a result, neither the character-printed area nor the solid-printed area was rubbed off when the ink sets according to EXAMPLES 1, 2 and 3 were used, and no finger was soiled. On the other hand, both character-printed area and solid-printed area were rubbed off, and the finger was also soiled when the ink set according to COMPARATIVE EXAMPLE 1 was used.

As described above, according to the present invention, image formation is feasible on recording media with substantially even rub-off resistance realized. In addition, high-quality images having improved clarity at contour portions of the images and that are free from occurrence of bleeding can be provided.

What is claimed is:

1. An ink set comprising a water-based ink containing a coloring material in a state dissolved or dispersed in an aqueous medium and a water-based reactive liquid containing a first component for insolubilizing or aggregating the coloring material in the ink by mixing with the water-based ink, wherein the water-based reactive liquid contains a water-soluble high-molecular compound in a state dissolved therein, the water-based ink contains a second component, which is not insolubilized by the first component and the coloring material, in a state dissolved therein, and the water-soluble high-molecular compound is not insolubilized by the first component and the coloring material but insolubilized by the second component.

2. The ink set according to claim 1, wherein the first component is a cationic substance.

3. The ink set according to claim 1, wherein the first component contains at least one selected from polyvalent metal ions and salts thereof.

4. The ink set according to claim 3, wherein the polyvalent metal is at least one selected from Ca, Cu, Ni, Mg, Zn, Ba, Al, Fe, Cr and Y.

5. The ink set according to claim 1, wherein the coloring material in the ink contains either an anionic dye or a pigment having a surface to which an anionic group is chemically bonded.

6. The ink set according to claim 1, wherein the ink contains a pigment as the coloring material and additionally an anionic dispersing agent.

7. The ink set according to claim 1, wherein the second component is such that causes the water-soluble high-molecular compound to gel or crosslink.

8. The ink set according to claim 1, wherein the water-soluble high-molecular compound has a hydroxyl group.

9. The ink set according to claim 8, wherein the water-soluble high-molecular compound is polyvinyl alcohol.

10. The ink set according to claim 9, wherein the second component is boric acid or a salt thereof.

11. The ink set according to claim 1, wherein the water-soluble high-molecular compound has an acetoacetyl group.

12. The ink set according to claim 11, wherein the second component is adipic dihydrazide.

13. A process for forming an image on a recording medium, comprising the steps of:

(i) applying the water-based ink making up the ink set according to any one of claims 1 to 12 to a recording medium by an inkjet recording method; and (ii) applying the water-based reactive liquid making up the ink set to the recording medium, wherein the step (ii) is conducted prior to the step (i) in such a manner that the water-based ink comes into contact with the water-based reactive liquid on the recording medium.

14. The image forming process according to claim 13, wherein the step (ii) is conducted to an area wider than an area of the recording medium, to which the ink is applied in the step (i).

15. A water-based ink suitable for use in conducting ink-jet recording on a recording medium, to which a water-based reactive liquid containing a water-soluble high-molecular compound and a first component for insolubilizing or aggregating a coloring material has been applied, wherein the ink contains the coloring material in a state dissolved or dispersed in an aqueous medium and has a second component for insolubilizing the water-soluble high-molecular compound.

16. The image forming process according to claim 13, wherein the water-based reactive is applied to the recording medium by roller coating or bar coating.

* * * * *